United States Patent [19]

Binding et al.

[11] 3,899,110

[45] Aug. 12, 1975

[54] FOLDABLE CAR TOP CARRIER

[75] Inventors: Kenneth W. Binding, Woburn; George A. Laberis, Wakefield, both of Mass.

[73] Assignee: Beatrice Foods Co., Chicago, Ill.

[22] Filed: Sept. 10, 1973

[21] Appl. No.: 395,948

[52] U.S. Cl............... 224/42.1 F; 52/726; 403/102
[51] Int. Cl............................................. B60m 9/04
[58] Field of Search......... 224/42.1 F, 42.1 E, 29 R; 403/102, 100, 62; 52/726; 29/155 R, 446

[56] References Cited
UNITED STATES PATENTS

| | | | |
|---|---|---|---|
| 2,434,387 | 1/1948 | Brandt | 224/42.1 F |
| 2,436,228 | 2/1948 | Purchase | 224/42.1 F |
| 2,579,780 | 12/1951 | Atwood | 403/102 X |
| 2,630,257 | 3/1953 | Nielsen | 224/42.1 F |
| 2,804,248 | 8/1957 | Samuels et al. | 224/42.1 F |

FOREIGN PATENTS OR APPLICATIONS

| | | | |
|---|---|---|---|
| 220,510 | 2/1959 | Australia | 224/42.1 F |
| 836,940 | 10/1938 | France | 224/42.1 F |

*Primary Examiner*—Robert J. Spar
*Assistant Examiner*—Jerold M. Forsberg
*Attorney, Agent, or Firm*—Robert T. Gammons

[57] ABSTRACT

A foldable car top carrier comprising two elongate rigid bars arranged end to end, a hinge connecting the adjacent ends to enable folding the bars from a straight line disposition to parallel positions, and legs mounted to the undersides of the respective bars near their distal ends for mounting the bars when arranged end to end spaced above the car top; characterized in that the adjacent ends of the bars are inclined downwardly and toward the distal ends thereof and the hinge comprises a rigid channel member within which the lower side of the adjacent ends of the bars are received in abutting engagement, and pins pivotally connecting the ends of the link to the ends of the bars on centers located below the longitudinal center lines of the bars and equidistant from the ends. Flexible straps are connected at one end to the respective legs and are provided at their other ends with hooks for engagement with the car top at opposite sides so as to attach the carrier to the top.

8 Claims, 12 Drawing Figures

PATENTED AUG 12 1975 3,899,110

SHEET 2

FOLDABLE CAR TOP CARRIER

BACKGROUND OF THE INVENTION

There are car top carriers available in many forms and for various purposes, some of which comprise a single rigid bar which extends across the entire width of the car top and others of which comprise two parts hinged to enable folding or telescopically interengaged to enable shortening for the purpose of storage. Two part carriers lack rigidity under load and yet are desirable because they are far easier to store prior to and after sale. This invention relates to folding carriers especially designed to eliminate sag at the hinge connecting the parts and in addition to provide a structure which when folded is compact, which is of simple and inexpensive design, which will carry a load comparable to a single rigid bar and which can be mounted to a car top without special tools.

SUMMARY

As herein illustrated, the car top carrier comprises two elongate rigid bars arranged end to end, hinge means connecting the adjacent ends to enable folding the bars from a straight line disposition to parallel positions, and legs mounted to the respective bars near their distal ends for mounting the bars, when arranged end to end, spaced above the car top; characterized in that the adjacent ends of the bars are inclined downwardly and toward their distal ends and the hinge comprises a rigid channel member within which the lower sides of the adjacent ends of the bars are received in abutting engagement and pins pivotally connecting the ends of the link to the ends of the bars on centers located below the longitudinal center lines of the bars and equidistant from the ends.

The legs are pivotally connected to the respective bars for folding inwardly toward the adjacent ends thereof into parallel relation with the bars and there is means on each of the legs cooperable with the bar with which it is pivotally connected for limiting pivotal movement of the legs from its parallel position to a position perpendicular to the underside of the bar. Each of the legs has at its lower end transversely spaced, forwardly and rearwardly extending feet for engagement with the car top on which there are mounted nonmetallic friction engendering pads. Each leg is provided with means for receiving one end of a flexible strap, to the other end of which is connected a hook for engagement with the ledge or gutter at that side of the car top to secure the carrier to the car top. Clamp collars are mounted on the respective bars for movement longitudinally thereof and clamping at a predetermined position thereon and these are arranged to receive the ends of flexible binding straps for securing a load resting on the carrier. Two such carriers are usually employed spaced longitudinally of the car top.

The invention will now be described in greater detail with reference to the accompanying drawings wherein.

Figure 3:
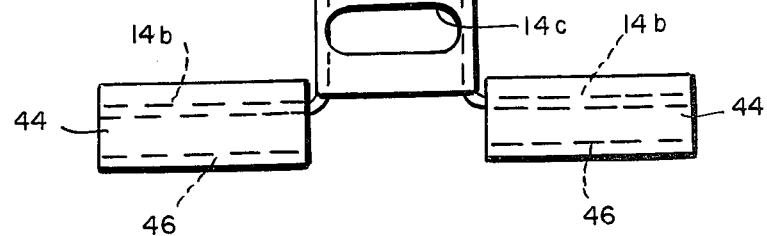
FIG. 3 is a section taken on the line 3—3 of FIG. 1.

Referring to the drawings the carrier comprises a pair of rigid, elongate supporting bars 10—10, hinge means 12 connecting the adjacent ends of the bars, legs 14—14 pivotally connected to the distal ends of the bars by means of which the bars are supported above the car top, straps 16—16 provided with attaching hooks 18—18 for attaching the carrier to the car top and clamp collars 20—20 on the respective bars for receiving binding straps 22—22 for fastening a load to the carrier. Each bar 10 (FIG. 3) is an extruded structure of generally rectangular configuration having spaced parallel side walls 24—24, top and bottom walls 26 and 28 and an intermediate wall 30 situated between the top and bottom walls. The top wall is provided with a longitudinal slot 32 and the bottom wall 28 with a longitudinal slot 34. The extruded structure is comprised of aluminum and the side walls may be provided with corrugations to add rigidity and strength to the structure.

Figure 7:
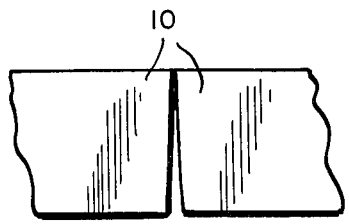
FIG. 7 is a fragmentary elevation of the adjacent ends of the bars prior to being connected with the inclinations at the ends of the bars exaggerated.

In accordance with this invention the ends of the bars 10—10 (FIG. 7) which are to be adjacent in the hinge are cut at a small angle of aporoximately 2° so that each end slopes from the upper side downwardly and toward its distal end. For all practical purposes these sections are prepared by cutting the extruded bar at an angle of 2° at intervals corresponding to the length required so that each end of each bar is inclined at an angle of 2° to a vertical line from top to bottom. This makes it possible to assemble any two bars for the purpose of this invention without having to check the end for angularity.

Figure 8:
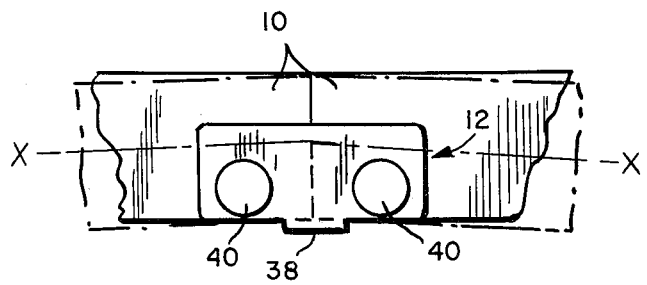
FIG. 8 is an elevation of the bars connected by a hinge, the dotted line position illustrating the positions of the bars prior to loading and the full line position illustrating the positions of the bars under load.
Figure 9:
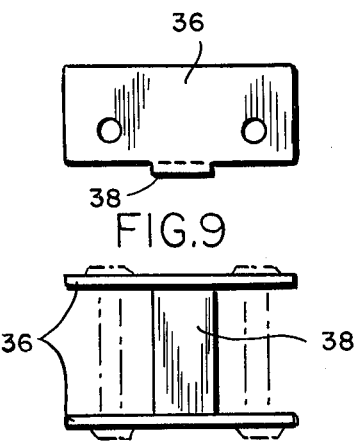
FIG. 9 is an elevation of the hinge.
Figure 9B:
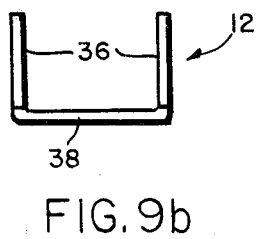
FIG. 9b is an end view of the hinge.
Figure 9A:
FIG. 9a is a plan view of the hinge.

The two bars are assembled with their inclined ends in abutting engagement as shown in dotted lines in FIG. 8, in which position the center lines X—X of the bars intersect at an obtuse angle of approximately 176°. While clamped firmly in this abutting engagement the hinge 12 is applied to the ends, the hinge (FIGS. 9, 9a and 9b) comprising a channel member having spaced parallel legs 36—36 connected by a bridge piece 38 so dimensioned as to receive the lower sides of the bars 10—10 (FIG. 8). Pivot pins 40—40 are inserted through holes drilled through the legs 36—36 and the walls 24—24 of the bars 10—10, which pivotally connect the ends of the hinge with the ends of the bars at the abutting ends thereof with the bridge member 38 centered with respect to the engaging ends of the bars. As thus constructed when the bars are unfolded and the carrier is mounted on a car top with the hinge at the underside the bars will, until a load is applied or is mounted on them, incline in opposite directions away from and downwardly from each other about 1° to 2° from the horizontal as illustrated in dotted lines in FIG. 8. When a load is applied the bars will be depressed at the hinge to a substantially horizontal position as illustrated in full lines in FIG. 8 and will sustain any load short of a load which would actually bend the bars themselves without sag at the hinge. This is achieved by cutting the ends of the bars at the slight angle of 2° referred to above so that the abutting ends of the bars above the hinge ends meet slightly ahead of those at the hinge line and take up any slack which may exist in the hinge itself, a conditin which is inevitably present in a structure of this kind.

Figure 1:
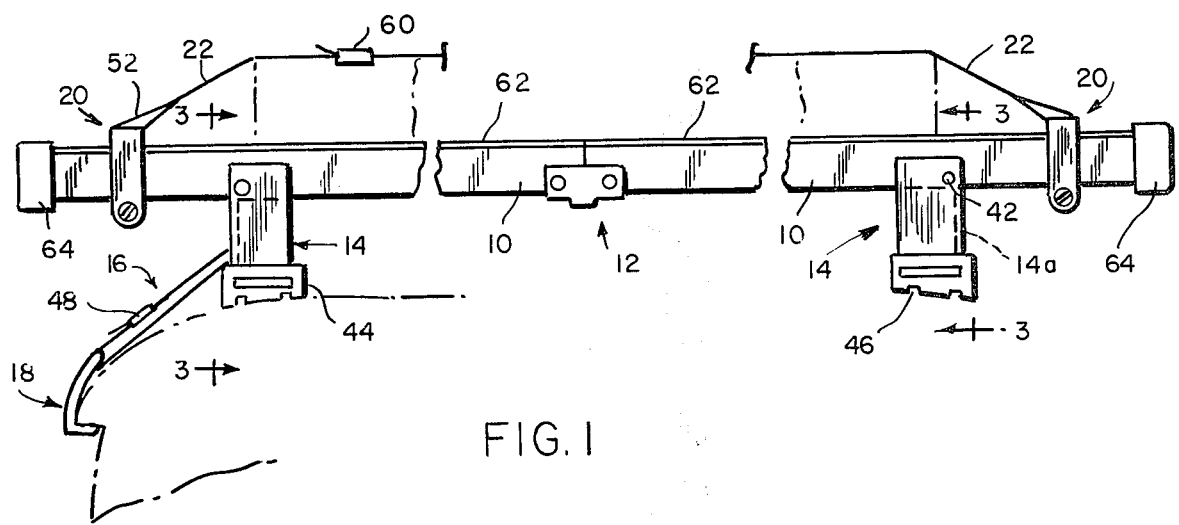
FIG. 1 is an elevation of the carrier mounted on a car top.
Figure 2:
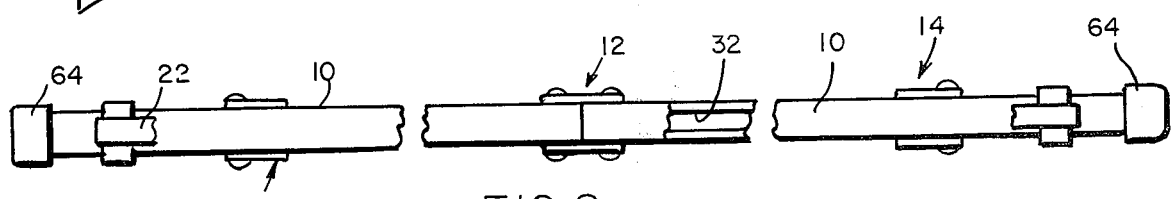
FIG. 2 is a top view with a portion at the top broken away.
Figures 4, 5:
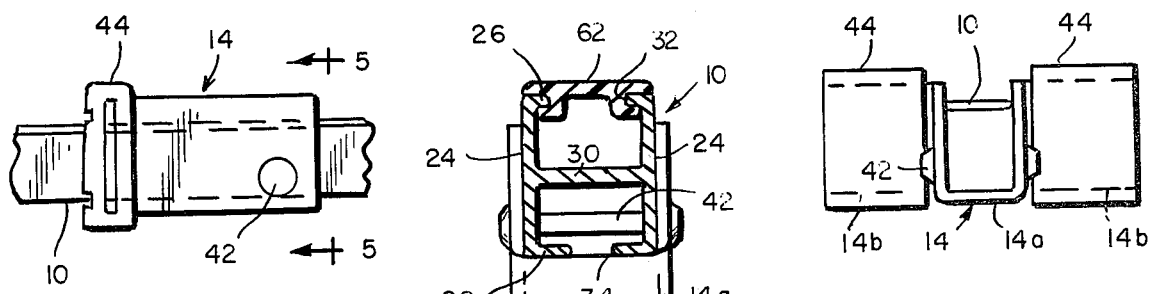
FIG. 4 is a fragmentary elevation showing one of the legs folded into parallel relation with the bar on which it is mounted.
FIG. 5 is an elevation taken on the line 5—5 of FIG. 4.
Figure 6:
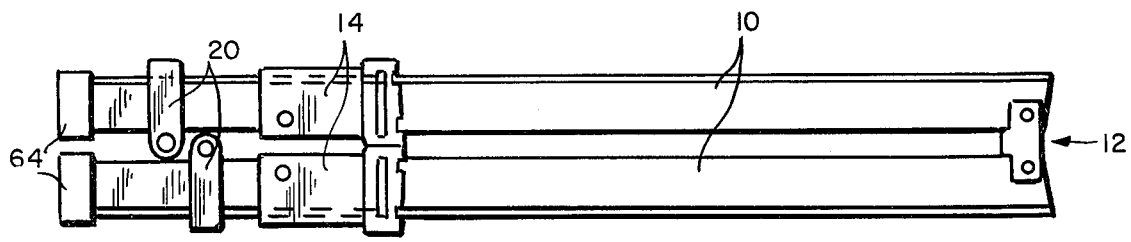
FIG. 6 is a plan view of the carrier folded.

The legs 14, by means of which the carrier is supported above the top of the vehicle, are pivotally mounted at their upper ends by means of pivot pins 42 through the side walls of the bars for pivotal movement from a vertical position, such as shown in FIG. 1, to a position parallel to the bars, as shown in FIG. 4. The legs 14 are of channel shaped (FIG. 5) and pivotally supported with their open sides facing inwardly so that when folded into parallel relation with the bars they receive the bars. The backs 14a of the legs provide stops which, by engagement with the undersides of the bars, prevent pivotal movement of the legs outwardly beyond the perpendicular positions shown in FIG. 1. The lower ends of the legs have spaced, forwardly and rearwardly extending, right angularly disposed feet 14b—14b on which are mounted pads 44—44 of a flexible friction engendering material such as rubber or plastic. The lower surfaces of these pads are preferably inclined outwardly and downwardly toward the ends of the bars and contain grooves 46. When folded the legs 14—14 receive the bars 10—10, as shown in FIGS. 5 and 6, and the feet 14b—14b extend laterally from opposite sides.

Each leg has in its back 14a an aperture 14c through which the strap 16 is threaded. As previously mentioned, a hook 18 is mounted on the strap and one end of the strap is provided with a buckle 48 by means of which the strap may be drawn taut to clamp the hook into engagement with the ledges or gutters at the edges of the car top.

Figure 10:
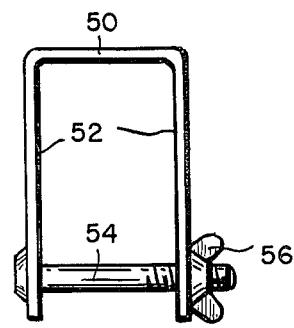
FIG. 10 is an elevation of one of the clamp collars.

The binding collars 20 are of U-shaped construction (FIG. 10), each comprising a bridge piece 50 corresponding to the width of the bar on which it is mounted, spaced parallel, downwardly extending legs 52—52 which extend downwardly below the bottom side of the bar which contain holes for receiving a clamp bolt 54 and thumb nut 56 by means of which it may be clamped to the bar at any desired predetermined position therealong. The bridge piece 50 is adapted to receive the loop 58 at one end of the binding strap 22. One of the binding straps is provided with a buckle 60 by means of which the straps from opposite sides may be connected to fasten a load to the carrier. The collars pivot and jam against the top of the bars when the straps 22 are drawn taut and hence will not slip along the bars. Both of the collars may be mounted at one side of the hinge if the load to be carried is to be mounted at one side only.

Capping strips 62—62 are mounted on the upper sides of the bars in the slots 32—32, these being comprised of a flexible material such as plastic which provides flat non-metallic surfaces for receiving the load. Additional capping members 64—64 are applied to the distal ends of the bars and in conjunction with the top capping strips afford an attractive finish for the carrier.

From the foregoing it is clear that the structure is of very simple make-up, provides for strength and rigidity for loads equal to that of a single rigid bar without sag and a structure which can be readily folded to provide a compact package, as shown in FIG. 6, both for the purpose of sale and for storage. Usually two such carriers are employed mounted in longitudinally spaced relation on the car top and as indicated above the carrier may be applied to tops with or without gutters.

The carrier bars have been described in some detail as comprised of extruded aluminum tubing; however wood bars may be substituted for the aluminum extrusions.

It should be understood that the present disclosure is for the purpose of illustration only and that this invention includes all modifications and equivalents falling within the scope of the appended claims.

We claim:

1. A foldable car top carrier comprising two elongate rigid bars arranged end to end, said bars having top and bottom sides, said top sides being adapted to support a load, legs mounted to the bottom sides of the bars for supporting the bars above the car top, and hinge means connecting the adjacent ends of the bars in abutting relationship; characterized in that the adjacent ends of the bars are oppositely inclined downwardly and toward their respective outer ends and the hinge means connects the bars with the adjacent ends of the inclined ends in abutting engagement and comprises a rigid channel member which receives the lower sides of said adjacent ends of the bars, and pins pivotally connecting said adjacent ends of the bars to said channel member on centers located below the center lines of the bars and equidistant from the ends, wherein said carrier may be folded for compact storage yet does not sag at the hinge when unfolded and loaded.

2. A foldable car top carrier comprising two elongate rigid bars arranged end to end, said bars having top and bottom sides, said top sides being adapted to support a load, legs mounted to the bottom sides of the bars for supporting them above the car top, and hinge means connecting the adjacent ends of the bars; characterized in that each of the adjacent ends of the bars are inclined downwardly and toward the distal ends of each of the respective bars and the hinge means connects said adjacent ends of the bars with the inclined ends in abutting engagement and comprises a rigid channel member having a bottom side and spaced parallel sides perpendicular thereto which receives said adjacent ends of the bars, and pins pivotally connecting said adjacent ends of said bars to the sidewalls of the channel member on centers located below the center lines of the bars and equidistant from the ends thereof, wherein said carrier may be folded for compact storage yet does not sag at the hinge when unfolded and loaded.

3. A foldable car top carrier according to claim 1, wherein the legs are pivotally connected to the bar for folding inwardly from positions perpendicular to the bar to nesting positions parallel thereto, and there is means on the legs engageable with the bars for preventing movement of the legs outwardly from said perpendicular positions.

4. A foldable car top carrier according to claim 3, wherein the legs are channel member in cross-section having a bottom side and spaced parallel sides perpendicular thereto and mounted with their open sides facing inwardly so as to receive the bars when folded inwardly into parallel relation thereto and wherein said first means comprises the bottom sides of said channel members.

5. A foldable car top carrier according to claim 3, wherein the legs have at their lower ends right angularly disposed feet and resilient pads mounted on the feet.

6. A foldable car top carrier according to claim 3, wherein the legs contain openings at their lower ends for receiving flexible straps and hooks are mounted on the straps for engagement with the edges of the top to attach the carrier to the top.

7. A foldable car top carrier according to claim 1, wherein there are clamp collars mounted on the bars adjustable along the bars, and binding straps connected to the clamp collars.

8. A foldable car top carrier according to claim 7, wherein the clamp collars are U-shaped, each having a bridge piece corresponding in width to the bar on which it is mounted and spaced parallel legs which extend downwardly beyond the bottom side of the bar, and a bolt mounted through holes in the legs at the underside of the bar pivotally connecting the clamp collar to the bar for angular movement about the axis of the bolt.

* * * * *